United States Patent
Duan et al.

(10) Patent No.: US 12,106,482 B2
(45) Date of Patent: Oct. 1, 2024

(54) LEARNING-BASED ACTIVE SURFACE MODEL FOR MEDICAL IMAGE SEGMENTATION

(71) Applicant: Tianjin University, Tianjin (CN)

(72) Inventors: Yuping Duan, Tianjin (CN); Yueyun Liu, Tianjin (CN); Wen Xu, Tianjin (CN)

(73) Assignee: Tianjin University, Tianjin (CN)

( * ) Notice: Subject to any disclaimer, the term of this patent is extended or adjusted under 35 U.S.C. 154(b) by 437 days.

(21) Appl. No.: 17/489,841

(22) Filed: Sep. 30, 2021

(65) Prior Publication Data

US 2023/0043026 A1 Feb. 9, 2023

(30) Foreign Application Priority Data

Aug. 3, 2021 (CN) .......................... 202110887252.0

(51) Int. Cl.
*G06T 7/10* (2017.01)
*G06F 18/214* (2023.01)
(Continued)

(52) U.S. Cl.
CPC .............. *G06T 7/10* (2017.01); *G06F 18/214* (2023.01); *G06T 7/0012* (2013.01); *G06T 17/20* (2013.01);
(Continued)

(58) Field of Classification Search
CPC ........... G06T 7/10; G06T 7/00; G06T 7/0012; G06T 17/20; G06T 2207/10081;
(Continued)

(56) References Cited

U.S. PATENT DOCUMENTS 11,406,826 B2 * 8/2022 Noble ................... A61B 34/10
2019/0205758 A1 * 7/2019 Zhu ....................... G06V 20/695
(Continued)

FOREIGN PATENT DOCUMENTS

CN 109509203 A 3/2019

OTHER PUBLICATIONS

Tianwei Ni, et al., Elastic Boundary Projection for 3D Medical Image Segmentation. 2019 IEEE/CVF Conference on Computer Vision and Pattern Recognition (CVPR), 2019, pp. 2104-2113.
(Continued)

*Primary Examiner* — Edward F Urban
*Assistant Examiner* — Benedict E Lee
(74) *Attorney, Agent, or Firm* — Bayramoglu Law Offices LLC

(57) ABSTRACT

A learning-based active surface model for medical image segmentation uses a method including: (a) data generation: obtaining medical images and associated ground truths, and splitting the sample images into a training set and a testing set; (b) raw segmentation: constructing a surface initialization network, parameters of the network trained by images and labels in the training set; (c) surface initialization: segmenting the images by the surface initialization network, and generating the point cloud data as the initial surface from the segmentation; (d) fine segmentation: constructing the surface evolution network, the parameters of the network trained by the initial surface obtained in step (c); (e) surface evolution: deforming the initial surface points along the offsets to obtain the predicted surface, the offsets presenting the prediction of the surface evolution network; (f) surface reconstruction: reconstructing the 3D volumes from the set of predicted surface points set to obtain the final segmentation results.

11 Claims, 3 Drawing Sheets

(51) Int. Cl.
  *G06T 7/00* (2017.01)
  *G06T 17/20* (2006.01)
(52) U.S. Cl.
  CPC ............... *G06T 2207/10081* (2013.01); *G06T 2207/20081* (2013.01); *G06T 2207/20084* (2013.01)
(58) Field of Classification Search
  CPC . G06T 2207/20081; G06T 2207/20084; G06T 7/11; G06T 7/149; G06T 2200/04; G06T 2207/30092; G06T 7/12; G06T 7/13; G06T 2207/10028; G06F 18/214; G06V 10/22; G06V 10/82; G06V 20/64; G06V 2201/03; G06N 3/045; G06N 3/08
  See application file for complete search history.

(56) References Cited

U.S. PATENT DOCUMENTS

| | | | | |
|---|---|---|---|---|
| 2021/0209339 A1* | 7/2021 | You | ...................... | G06V 10/454 |
| 2021/0248761 A1* | 8/2021 | Liu | ........................ | G06N 3/045 |
| 2021/0298592 A1* | 9/2021 | Ashok | .................... | A61B 3/102 |
| 2022/0012954 A1* | 1/2022 | Buharin | .................... | G06T 5/70 |
| 2022/0028085 A1* | 1/2022 | Vasilev | ................... | G16H 30/40 |
| 2022/0036124 A1* | 2/2022 | Gao | ....................... | G06N 3/088 |
| 2022/0237801 A1* | 7/2022 | Kaufman | ............... | G06N 3/045 |
| 2022/0292279 A1* | 9/2022 | Li | ........................ | G06V 40/172 |

OTHER PUBLICATIONS

Lihong Guo, et al., Learned snakes for 3d image segmentation. Signal Processing, 2021, pp. 1-11, 183:108013.

Qihang Yu, et al., Recurrent Saliency Transformation Network: Incorporating Multi-Stage Visual Cues for Small Organ Segmentation, CVF, 2018, pp. 8280-8289.

Fausto Milletari, et al., V-net: Fully Convolutional Neural Networks for Volumetric Medical Image Segmentation, 2016 Fourth International Conference on 3D Vision, CPS, 2016, pp. 565-571.

* cited by examiner

LEARNING-BASED ACTIVE SURFACE MODEL FOR MEDICAL IMAGE SEGMENTATION

CROSS REFERENCE TO THE RELATED APPLICATIONS

This application is based upon and claims priority to Chinese Patent Application No. 202110887252.0, filed on Aug. 3, 2021, the entire contents of which are incorporated herein by reference.

TECHNICAL FIELD

The image segmentation technique, in particular the learning-based active surface model for medical image segmentation, can be applied to the intelligent medical ward system and computer-aided diagnosis.

BACKGROUND

The development of deep learning methods has brought a rapid improvement in computer vision. However, medical image segmentation is a three-dimensional task. The natural image segmentation methods are not good enough to be directly applied to medical images. Existing deep neural networks for such 3D segmentation tasks can be roughly divided into two categories by the dimensionality of the data. The first type of method trains 2D networks on slices cutting from the 3D volumes in three orthogonal planes by sacrificing 3D geometric information. The other type of method uses 3D networks to deal with volumetric data directly by consuming large GPU memory, or directly process 3D data with 3D networks after down-sampling to save computational costs. However, segmenting a small organ from CT scans, such as the pancreas, spleen, and so on, is a very challenging task due to the high variabilities in shape, size, and location. The segmentation results of the above two methods still suffer from the over-segmentation effect and inaccurate boundaries.

The active surfaces are well-known models for segmentation, which are very efficient and require low memory for dealing with high-dimensional image problems. However, the traditional active surfaces method requires a good surface initialization and numerically converges slow, which limits its usage in practice. Motivated by the classical active surface, some learning-based active surfaces/contours methods are proposed for image segmentation, such as EBP, LSM and so on. The elastic boundary projection (EBP) [Tianwei Ni, Lingxi Xie, Huangjie Zheng, Elliot K Fishman, and Alan L Yuille. Elastic boundary projection for 3d medical image segmentation. In Proceedings of the IEEE Conference on Computer Vision and Pattern Recognition (CVPR), pages 2109-2118, 2019.] adapted the elastic shells to seek the actual boundary of the target, which used the 2D U-net to deal with volumetric data, and LSM [Lihong Guo, Yueyun Liu, Yu Wang, Yuping Duan, and Xue-Cheng Tai. Learned snakes for 3d image segmentation. Signal Processing, 183: 108013, June 2021.] applied an end-to-end learned snakes model (LSM) for 3D medical image segmentation by estimating the initial surface and evolving the final surface by 2D networks. Both LSM and EBP used image intensities to estimate the target surfaces by the 2D U-nets, where the mismatch between input and output data seriously affects the prediction accuracy.

Moreover, application No. 201811208492.8 of China, released a semi-automatic brain image segmentation method, which took advantage of the atlas registration method and the active contour segmentation method. It leveraged the shape prior of the atlas effectively, and produced a smooth and continuous boundary of the target, however, this method was not fully automated. It need to select the points on the contour and add topological relations manually to build up the active contour initialization.

The present invention aims to use a neural network to deform an initial surface to match the objective surface for 3D segmentation tasks. By using networks to learn initialization and evolution from data, the present model is fully automated, effective and efficient.

SUMMARY

Aiming at the blurred boundaries, adhesion problems, and low accuracy, the present disclosure proposes an active surfaces method for medical image segmentation based on deep neural network, which is composed of a surface initialization network and a surface evolution network. It deforms the objective surface by a point cloud network to produce the accurate segmentation result. The present model improves both the accuracy and efficiency compared to the existing surface-based segmentation methods.

In order to achieve the goals, the technical solution for realizing the present invention is: the learning-based active surface model for medical image segmentation, which comprises:

Step 1: data generation: obtaining the medical images and the associated ground truths, and splitting the sample images into a training set and a testing set, Step 2: raw segmentation: constructing the surface initialization network, parameters of the network trained by images and labels in the training set;

Step 3: surface initialization: segmenting the images by surface initialization network, and generating the point cloud data as the initial surface from the segmentation;

Step 4: constructing the surface evolution network with the parameters of the network trained by the initial surface obtained in step 3;

Step 5: surface evolution: deforming the initial surface points along the offsets to obtain the predicted surface with the offsets presenting the prediction of the surface evolution network;

Step 6: surface reconstruction: reconstructing the 3D volumes from the set of predicted surface points set to obtain the final segmentation results.

The headstream part of the surface evolution network consists of a KP convolutional layer, a one-dimensional normalization and a leaky activation function. Then there are five parts in the encoder of the network. The first and the last part contains two KP residual modules, while the other three parts contain 3 KP residual modules. The last KP residual modules in the first four parts have down-sampling operation. There are four up-sampling modules in the decoder of the network, where each up-sampling module contains an up-sampling layer and a shared multilayer perceptron, followed by a normalization layer and an activation function. Finally, two multilayer perceptrons are used to output the final prediction.

Each pixel-wise label, obtained in step 1, is a binary image with the same size of the corresponding sample image, where value 1 indicates the desired target organ, and value 0 otherwise. The interpolation method used in up-sampling operation is the bilinear interpolation.

The training method of the initializing network in step 2 is: first, cut each sample image in the training set into two-dimensional slices along the third dimension. Assuming the size of a three-dimensional CT image is H×W×D, the image can be regarded as two-dimensional images of size H×W stacked together, and each two-dimensional image is called a slice of a three-dimensional CT image. Input the slices to the surface initialization network to obtain segmented predictions, where the binary cross-entropy is used as the loss function for training. The parameters of the initialization network are updated by the stochastic gradient descent method.

The coarse segmentation is obtained as follows. Firstly, we cut each sample image in the training set and split test set into two-dimensional slices along the third dimension. Then we sequentially input the slices of each three-dimensional CT image to the surface initialization network to obtain the two-dimensional segmentation predictions. Finally we stack the two-dimensional segmentations sequentially to obtain the corresponding three-dimensional coarse segmentation prediction.

The method to pick up the surface points from the coarse segmentations is: selecting the pixels of value 1, and at least one of their adjacent pixels is of value 0.

Let the set of selected surface points be $S=\{x_1, x_2, x_3, \ldots, x_n\}$, where n is the number of surface points. The narrow band of the surface $\tilde{S}=\{\tilde{x}_i \in \mathcal{P} \mid d(\tilde{x}_i, S) \leq 1\} = \{\tilde{x}_1, \tilde{x}_2, \tilde{x}_3, \ldots, \tilde{x}_N\}$ is used as the initial surface, where $\mathcal{P}$ represents all pixels of the image, and $$d(\tilde{x}_i, S) = \min_{x \in S} dist(\tilde{x}_i, x)$$

presents the distance from the pixel $\tilde{x}_i$ to the surface S defined as the minimum distance between the pixel $\tilde{x}_i$ and the points in the surface points set S. The distance $dist(\tilde{x}_i, x) = \|\tilde{x}_i - x\|^2$ is the Euclidean distance between the two points $\tilde{x}_i$ and x, and N denotes the number of points in the set $\tilde{S}$. The set $\tilde{S}$ is used as the initial surface for evolution.

The structure of the surface evolution network includes the headstream part of the surface evolution network consists of a KP convolutional layer, a one-dimensional normalization and a leaky activation function. Then there are five parts in the encoder of the network. The first and the last part contains two KP residual modules each, while the other three parts contain 3 KP residual modules each. The last KP residual modules in the first four parts have down-sampling operation. There are four up-sampling modules in the decoder of the network, each of which contains an up-sampling layer and a shared multilayer perceptron, followed by a normalization layer and an activation function. Finally, two multilayer perceptrons are used to output the final prediction.

Since some points are dropped in the down-sampling operations, the up-sampling layers are used to restore those points by the nearest interpolation algorithm. After each up-sampling operation, the features are concatenated with the corresponding low-level features in the encoder, then the shared multilayer perceptron is used to aggregate the features.

The inputs of the KP convolution are the point cloud data consisting of all points in a sphere centered on $\tilde{x}$, which is defined as $N(\tilde{x}) = \{z_i \in \mathcal{P} \mid dist(z_i, \tilde{x}) \leq r\}, \tilde{x} \in \tilde{S}$, with $\tilde{s}$ representing the radius of the sphere, $\tilde{x}$ presenting the point in the set of initial surface points, $\mathcal{P}$ representing all the pixels of the image, $z_i$ being the points in the sphere, and $\tilde{s}$ being the set of initial surface points. The KP convolution is an operation used to integrate the features. Let $\mathcal{F}$ denote the input features and $f_i$ be the feature of the point $z_i$. We define the kernel point convolution as $$(\mathcal{F} * g)(\tilde{x}) = \sum_{z_i \in N(\tilde{x})} g(z_i - \tilde{x}) f_i,$$

and the kernel function g as $$g(z_i - \tilde{x}) \sum_{k<K} \max\left(0, 1 - \frac{\|(z_i - \tilde{x}) - y_k\|}{\sigma}\right) W_k,$$

where $\{y_k \mid \|y_k\|^2 \leq r, k < K\}$ denotes the K kernel points, $\sigma$ denotes the influence distance of the kernel points and $\{W_k \mid k < K\}$ is the associated weight matrices to learn from the point cloud data.

The following L2 norm between the prediction and target offsets is used as the loss function for the surface evolution network $$\mathcal{L}_{top\_k}(\theta) = \frac{1}{M} \sum_{z_i \in N(\tilde{x})} (\|\delta(z_i) - \gamma(z_i)\|^2),$$

where the loss function $\mathcal{L}_{top\_k}(\theta)$ only supervises on the top k loss of convolutional points to focus on hard points, $z_i$ represents all the convolutional points, $\delta(z_i)$ are the ground-truth offsets of $z_i$, and $\gamma(z_i)$ are the corresponding predicted offsets. $N(\tilde{x}) = \{z_i \in \mathcal{P} \mid dist(z_i, \tilde{x}) \leq r\}$ is the input point cloud data, which means it consists of the points in a sphere centered on $\tilde{x}$ with a radius r.

The stochastic gradient descent method is used to update the parameters of the network.

The method of calculating the position of the target boundary according to the predicted offsets is as follows:

Estimate the position of the predicted surface points by evolving the initial surface points along the corresponding predicted offsets:

$$u_i = \tilde{x}_i + \gamma(\tilde{x}_i), \forall \tilde{x}_i \tilde{S}$$

where $\tilde{x}_i$ presents the initial surface points, $\gamma(\tilde{x}_i)$ presents the corresponding predicted offsets of $\tilde{x}_i$, and $\tilde{S}$ is the set of initial surface points.

The surface reconstruction method mentioned in step 6 is presented as follows. Firstly, we use the Delaunay triangulation to build up the triangle mesh from the prediction surface points set $\mathcal{U} = \{u_1, u_2, \ldots u_N\}$, and obtain the alpha shape mesh by removing the tetrahedrons with a circumradius larger than 5. Then the subdivide algorithm is used to voxelize the alpha shape mesh to obtain a closed surface, and finally the flood fill algorithm is adopted to fill the holes in the closed surface and generate the final 3D segmentation.

The present invention discloses a fully automated medical image segmentation model, which can not only improve the segmentation accuracy, but also save time compared to other boundary-based methods. First, a surface initialization network is used to predict a coarse segmentation and estimate the initial surface. Then the surface evolution network is used to predict offsets and evolve the surface points. The simulation results show that, on the one hand, the invention evolves the surface of the coarse segmentation to a more desirable position; on the other hand, the invention not only surpasses some deep learning models in the accuracy, but is also faster than some learning-based active surface methods in speed.

BRIEF DESCRIPTION OF THE DRAWINGS

To describe the embodiments and the technical solutions of the present invention clearly, the following will briefly introduce the figures. Whilst the following description describes exemplary embodiments, it will be understood by those skilled in the art that many variations of the embodiment can be made within the scope and spirit of the present invention.

DETAILED DESCRIPTION OF THE EMBODIMENTS

The technical solutions for the embodiments are described below clearly with some figures. Obviously, the following description describes exemplary embodiments, it will be understood by those skilled in the art that many variations of the embodiment can be made within the scope and spirit of the present invention.

Figure 1:
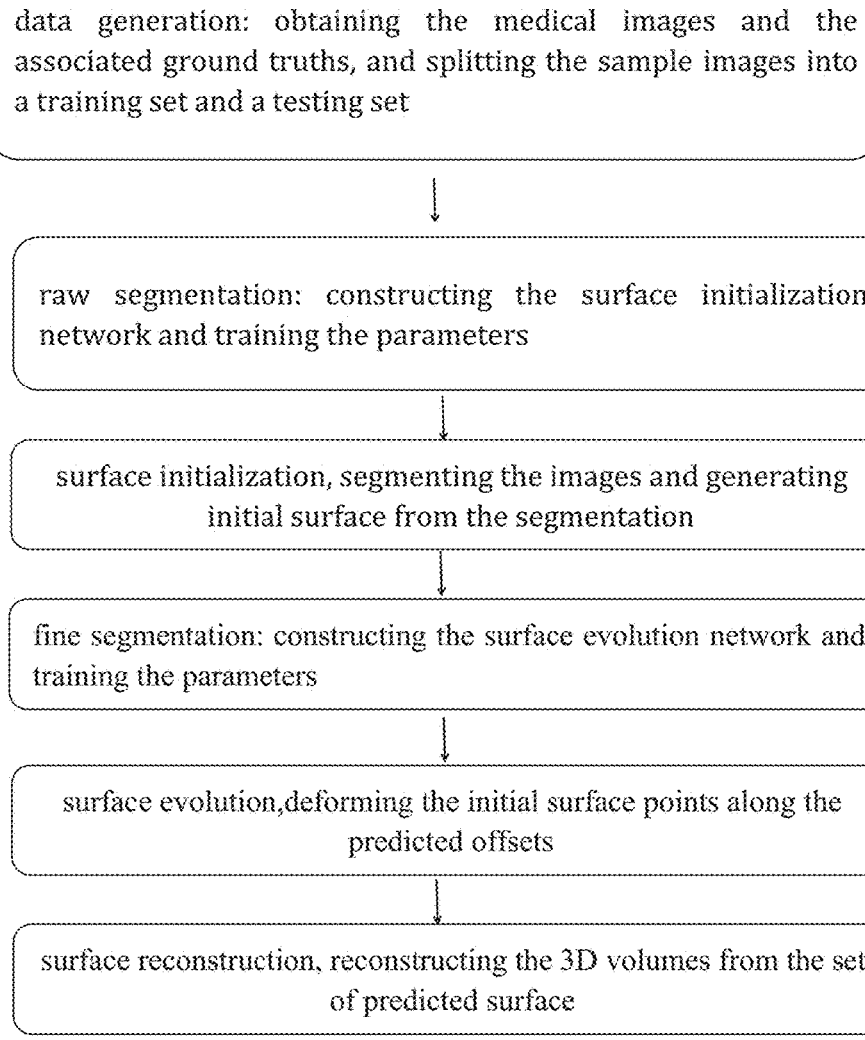
FIG. 1 is the flow chart of the present invention.

As shown in FIG. 1, the learning-based active surface model proposes a fully automated organ segmentation model for 3D CT scans. The organ segmentation model is inspired by a variational method, the active contour/surface, including two stages: surface initialization and surface evolution. In the first stage, obtain the coarse segmentation through the surface initialization network; then estimate the initial surface from the coarse segmentation. In the second stage, input the initial surface, a point cloud data, to the surface evolution network and obtain the offsets, then deform the initial surface according to the offsets. The final segmentation results are reconstructed from the evolved surface points. Specific steps are as follows:

Step 1: data generation: obtaining the medical images and the associated ground truths, and splitting the sample images into a training set and a testing set;

We obtain the three-dimensional CT medical images, and then split the images into two parts: training set and testing set, where the label data are given for data in the training set. The associated label is an image of the same size, whose pixels are marked by 0 or 1. Usually, the labeling work is done by professionals such as doctors.

Figure 2:
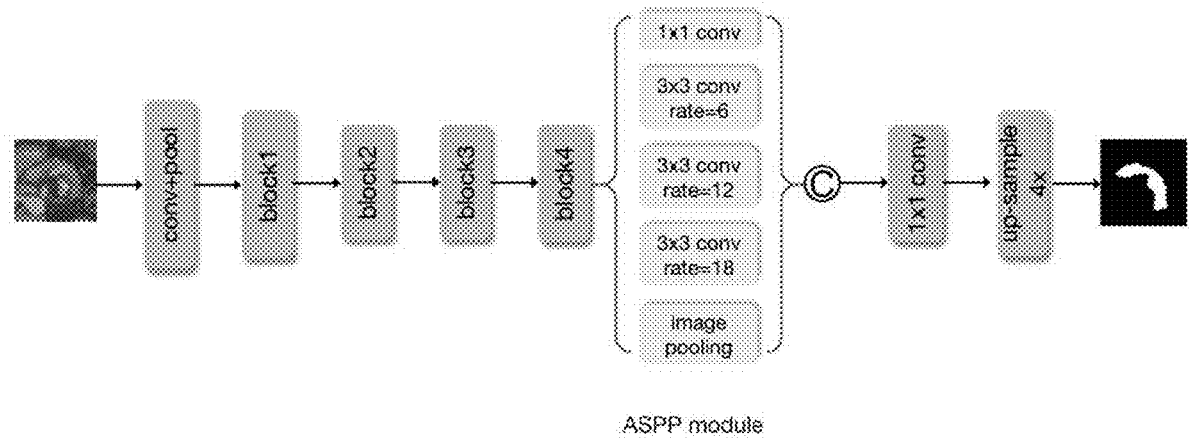
FIG. 2 is the illustration of the surface initialization network structure of the invention.

Step 2: raw segmentation: constructing the surface initialization network, parameters of the network trained by images and labels in the training set;

As shown in FIG. 2, the structure of the initialization network is given as follows. The headstream part of the surface initialization network contains a convolutional layer, a batch normalization, an activation function, and a max pooling layer. Specifically, the kernel size and step size of the convoluitoinal layer is 7×7 and 4, respectively. The convolutional operations are linear transformations, while the activation function is a non-linear projection. The max pooling layer is a kind of down-sampling operation, which reduces the resolution of the images to remove redundant information and reduce calculations. Then there are 4 residual modules. The last convolution layers of the first two residual modules have a step size of 2. The convolutional layer with a step size of 2 is also a kind of down-sampling operation. The convolutional layers of the third residual module and the fourth residual module are dilated convolutions, the rates of the dilated convolutions are 2 and 4, respectively. The basic difference between the dilated convolution and the standard convolution is the kernel. There are some holes in the kernel of the dilated convolution, and the dilated rate controls the size of the holes. By the kernel with holes, the receptive field are enlarged without increasing parameters. The following is the atrous spatial pyramid pooling module, which consists of a 1×1 convolutional, three dilated convolutions, and a global pooling in parallel. The dilated rate of the three expanded convolutional layers are 6, 12, and 18 respectively. The atrous spatial pyramid pooling module is used to extract more potential the features. The output features of these parallel layers are concatenated together, and another two 1×1 convolutional layers are used to integrate these features and produce a small resolution segmentation.

Finally, the up-sampling operation with bilinear interpolation is used to restore the binary segmentation to the original size.

Train the parameters of the initialization network by the images and labels in the training set. First, we cut the images into two-dimensional slices along the third dimension. Assuming the size of a three-dimensional CT image is H×W×D, the image can be regarded as two-dimensional images of size H×W stacked together, and each two-dimensional image is called a slice of a three-dimensional CT image. We input the slices to the surface initialization network to obtain the corresponding segmentations, where the binary cross-entropy between the labels and predictions is used as the loss function for training. The parameters of the initialization network are updated by the stochastic gradient descent method.

Step 3: surface initialization: segmenting the images by surface initialization network, and generating the point cloud data as the initial surface from the segmentation;

Once the initial network is trained, a coarse segmentation model of CT images is obtained. The images of both the training and testing set are input to the initial network, and the network produces the coarse segmentation results. The coarse segmentation of the training set is used to train the surface evolution network, and the coarse segmentation of the testing set is used to test the surface evolution network in the next phase. The specific operations are as follows:

Firstly, we cut each sample image in the training set and testing set into two-dimensional slices along the third dimension. Then we sequentially input the slices of each three-dimensional CT image to the surface initialization network to obtain the two-dimensional segmentation predictions. Finally we stack the two-dimensional segmentations sequentially to obtain the corresponding three-dimensional coarse segmentation prediction. Specifically, we stack D two-dimensional segmentations of size H×W into a three-dimensional image of size H×W×D. However, the segmentation predicted by the surface initialization network is not desirable. Based on the coarse segmentation, some methods use another network to predict again. In contrast, the presented model uses a network to deform the inaccurate surface to the accurate object surface.

Estimating the surface means picking up the surface points from the coarse segmentation. Indeed, the value of the surface initial network prediction ranges in [0,1]. A threshold being 0.5 is adapted to transform the predicted probability map to a binary segmentation, with each pixel of value 0 or 1, where 1 represents the target object, and 0 otherwise. Each pixel has 6 adjacent positions of front and back, left and right, and up and down. A pixel is regarded as a surface point, if it is of value 1, and at least one of the six adjacent pixels is of value 0. To be noticed, the surface is not satisfactory, due to the unsatisfactory coarse segmentation.

Let the set of selected surface points be $S=\{x_1, x_2, \ldots x_n\}$, where n is the number of surface points. The narrow band of the surface $\tilde{S}=\{\tilde{x}_i \in \mathcal{P} \mid d(\tilde{x}_i, S) \leq 1\} = \{\tilde{x}_1, \tilde{x}_2, \tilde{x}_3, \ldots, \tilde{x}_i, \ldots, \tilde{x}_N\}$ is used as the initial surface, where $\mathcal{P}$ represents all pixels of the image, and $$d(\tilde{x}_i, S) = \min_{x \in S} dist(\tilde{x}_i, x)$$

presents the distance from the pixel $\tilde{x}_i$ to the surface S defined as the minimum distance between the pixel $\tilde{x}_i$ and the points in the surface points set S. The distance $dis(\tilde{x}_i, x) = \|\tilde{x}_i - x\|^2$ is the Euclidean distance between the two points $\tilde{x}_i$ and x, and N denotes the number of points in the set $\tilde{s}$. The set $\tilde{s}$ is used as the initial surface for evolution. Experimentally, using the point set of narrow band, rather than the set of selected surface points, as initial surface can increase the robustness of initialization and stability of the evolution.

On the other hand, the corresponding ground truth offsets are generated for training the surface evolution network according to the labels in the training set. Similarly, the pixel-wise label is binary with a value of 1 indicates the target organ, and 0 otherwise. The surface points are selected by the value of pixels and the adjacent pixel in the aforementioned way. Assuming the ground truth surface points set T contains m points $T=\{y_1, y_2, y_3, \ldots, y_m\}$ the ground truth offsets of initialization surface points $\tilde{x}_i$ are uniquely determined by the $\delta(\tilde{x}_i) = \tilde{x}_i - y^*$, i=1, 2, ... N, where $\tilde{x}_i$ presents the points in the initialization surface points set, and $$y^* = \operatorname*{argmin}_{y \in T} \|\tilde{x}_i - y\|^2$$

presents the point in the ground truth surface points set whose distance to the point $\tilde{x}_i$ is minimal.

The ground truth offsets $\delta(\tilde{x}_i)$ is the target to be predicted by the surface evolution network. And the initial surface in the training set and the corresponding ground truth offsets are training pairs for surface evolution network.

Step 4: fine segmentation: constructing the surface evolution network, the parameters of the network trained by the initial surface obtained in step 3;

Since the surface points are point cloud data in space, the present invention uses the point cloud network to learn the offsets from the data, rather than rearranging the surface points in space into a two-dimensional plane. Since the position information of the surface points destroys during the rearrangement, the two-dimensional network learning from the plane data, cannot leverage the position information of the surface points.

Figure 4:
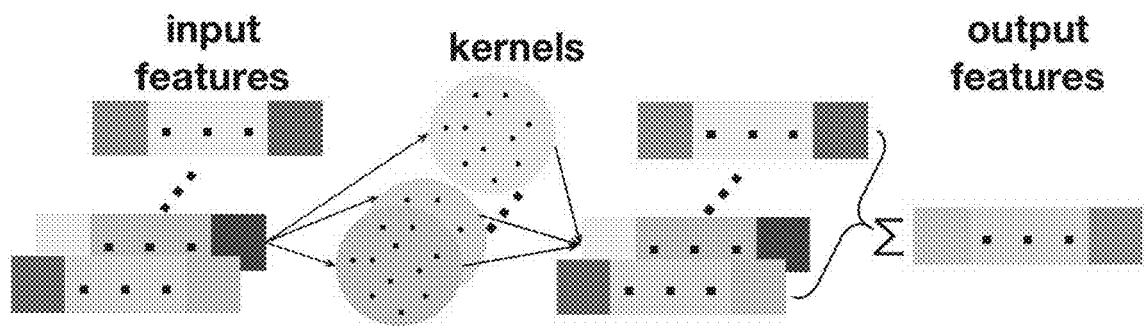
FIG. 4 is the illustration of the KP convolution of the invention.

The surface evolution network leverages the KP convolution (kernel point convolution), which combines local features according to the 3D geometric structure of the point cloud data. The inputs of the KP convolution are point cloud data consisting of all neighboring points in a sphere centered on $\tilde{x}$, denoted as $N(\tilde{x}) = \{z_i \in \mathcal{P} \mid dist(z_i, \tilde{x}) \leq r\}$, $\tilde{x} \in \tilde{S}$, where r represents the radius, $\tilde{x}$ presents the initial surface point, $\mathcal{P}$ represents all the pixels of the image, $z_i$ are the points in the sphere, and $\tilde{s}$ is the set of initial surface. Let $\mathcal{F}$ denote the input features and $f_i$ be the features of the point $z_i$. As shown in FIG. 4, kernel point convolution which associates the features with the kernel function g is defined as follow $$(\mathcal{F} * g)(\tilde{x}) = \sum_{z_i \in N(\tilde{x})} g(z_i - \tilde{x}) f_i,$$

and the kernel function g is defined as:

$$g(z_i - \tilde{x}) \sum_{k < K} \max\left(0, 1 - \frac{\|(z_i - \tilde{x}) - y_k\|}{\sigma}\right) W_k,$$

where $\{y_k \mid \|y_k\|^2 \leq r, k < K\}$ denotes the K kernel points, $\sigma$ denotes the influence distance of the kernel points and $\{W_k \mid k < K\}$ is the associated weight matrixes to learn from the samples.

Figure 3:
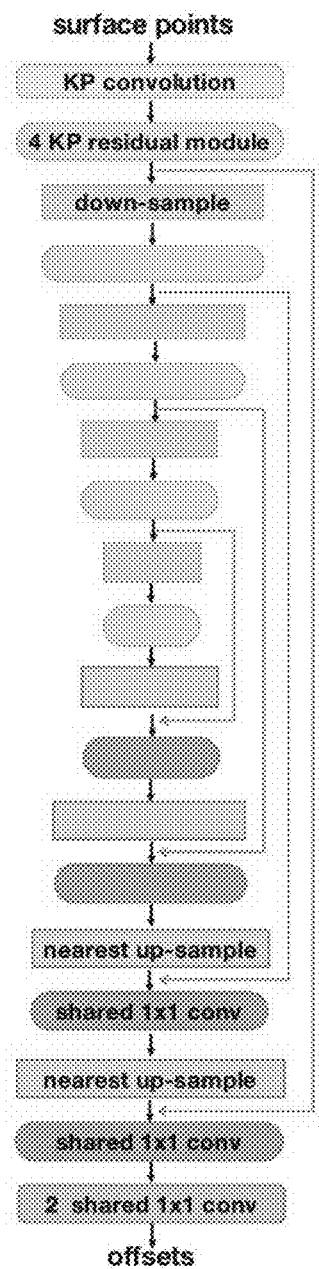
FIG. 3 is the illustration of the surface evolution network structure of the invention.

As shown in FIG. 3, The structure of the surface evolution network is as follows: the headstream part of the surface evolution network consists of a KP convolutional layer, a one-dimensional normalization and a leaky activation function. Then there are five parts in the encoder of the network. The first and the last part contains two KP residual modules, while the other three parts contain 3 KP residual modules. The last KP residual modules in the first four parts have a down-sampling operation, which randomly drops out some points to reduce the density of the points. The radius of the kernel point convolution are increased as the density decrease to enlarge the receptive fields. There is no down-sampling operation in the last part, since the non-local features extraction is efficient. Then there are four up-sampling modules, each up-sampling module contains an up-sampling layer and a shared multilayer perceptron, followed by a normalization layer and an activation function. The up-sampling operations in the up-sampling layers restore the dropped points by the nearest interpolation algorithm, such that the number of the prediction points is consistent with the number of the input. After each up-sampling operation, the features are concatenated with the corresponding low-level features in the encoder, then the shared multilayer perceptron is used to aggregate the features. Finally, there are two multilayer perceptrons and a one-dimensional normalization, which are used to output the prediction $\gamma(x)$. The prediction is the offsets of the corresponding surface points.

Calculate the two norms of the prediction offsets of the network and the ground-truth offsets:

$$\mathcal{L}_{top\_k}(\theta) = \frac{1}{M} \sum_{z_i \in N(\tilde{x})} (\|\delta(z_i) - \gamma(z_i)\|^2),$$

where the loss function $\mathcal{L}_{top\_k}(\theta)$ only supervises on the top M loss of points to focus on hard samples, $z_i$ represents the convolutional points, $\delta(z_i)$ are the corresponding groundtruth offsets of $z_i$, $\gamma(z_i)$ is the predicted offsets. In the experiments, we set M to $M=0.65|N(\tilde{x})|$, which can improve the fitting ability of the surface evolution network by driving the network to focus on the inaccurate predictions. $\mathcal{L}_{top,k}(\theta)$ is used as the training loss function for the surface evolution network, and the stochastic gradient descent method is used to update the parameters of the network.

Step 5: surface evolution: deforming the initial surface points along the offsets to obtain the predicted surface, where the offsets present the prediction of the surface evolution network;

After training the surface evolution network, input the points $N(\tilde{x})=\{z_i \in \mathcal{P} \text{ dist}(z_i, \tilde{x}) \leq r\}$ on initialization surface obtained in step 3 to the surface evolution network. To be noticed, the neighbor points $N(\tilde{x})$ of the surface point $\tilde{x}$ also contains other points near the surface. Thus, one can obtain the offsets of all the initial surface points without testing all the neighbor spheres. With the prediction offsets, the target position of the surface points is determined by adding the offsets to the coordinates of their initial position:

$$u_i = \tilde{x}_i + \gamma(\tilde{x}_i), \forall \tilde{x}_i \in \tilde{S}$$

where $\tilde{x}_i$ presents the coordinates of the position of the initial position for the points on surface, $\gamma(\tilde{x}_i)$ presents the offsets predicted by the surface evolution network, and $\tilde{S}$ is the set of initial surface points. For a three-dimensional image, the position of each pixel can be uniquely determined by the three-dimensional coordinates, and the offsets are also three-dimensional vectors whose values and signs represent the moving distance and the direction along three dimensions, respectively. Therefore, the location of the predicted surface points can be uniquely determined by the coordinates of each initialization point and the corresponding predicted offset.

The second network predicts the offsets of the surface points. The initial surface is evolved according to the offsets. Thus, the set of predicted surface points $\mathcal{U}=\{u_1, u_2, \ldots u_N\}$ are obtained.

Step 6: surface reconstruction: reconstructing the 3D volumes from the set of predicted surface points set to obtain the final segmentation results.

After obtaining the evolved surface points set $\mathcal{U}=\{u_1, u_2, \ldots u_N\}$, surface reconstruction is required, since the final result should be a binary segmentation with the same size of the original image, rather than points set.

First, we use the Delaunay triangulation to build up the triangular mesh from the predicted boundary points set, and obtain the alpha shape mesh by removing the tetrahedrons with a circumradius larger than 5. Then we use the subdivide algorithm to voxelize the alpha shape mesh to obtain a closed surface. Finally, the flood fill algorithm is used to fill the holes in the closed surface and the final 3D segmentation volumes are obtained.

Dice Similarity Coefficient (DSC), Hausdorff distance (HD) and computational time are used to evaluate the performance of the presented model. All the experiments are done on NVIDIA's GPU Titan RTX using Pytorch.

Dice Similarity Coefficient (DSC) measures the similarity between two sets defined as follows:

$$DSC(\tilde{P}, P) = \frac{2|\tilde{P} \cap P|}{|\tilde{P}| + |P|},$$

where P presents the final binary segmentation results predicted by the model, and $\tilde{P}$ presents associated label. The larger the DSC is, the better the segmentation result is.

The Hausdorff distance (HD) measures the distance between two surfaces defined as follows:

$$HD(\tilde{P}, P) = \max\left\{\max_{x \in \partial \tilde{P}} \min_{y \in \partial P} \|x-y\|^2, \max_{y \in \partial P} \min_{x \in \partial \tilde{P}} \|x-y\|^2\right\}$$

where $\partial P$ presents the points set of the predicted organ surface, and $\partial \tilde{P}$ presents the points set of the ground truth organ surface. The smaller the HD is, the closer the two surfaces is, and the better the prediction result is.

The results of related methods were compared on the MSD (Medical Segmentation Decathlon) spleen dataset, which contains 41 volumes. We randomly divide the dataset into two groups, one group containing 21 volumes used for training and the other one with 20 volumes used for testing.

TABLE 1

| | Results on the MSD spleen dataset | | | | |
|---|---|---|---|---|---|
| Methods | 2D methods RSTN | 3D methods VNet | 2D surface evolution methods EBP | 2D surface evolution mthods LSM | The present invention |
| DSC (%) | 89.70 | 92.94 | 92.79 | 93.03 | 95.21 |
| 95% HD (mm) | — | — | 5.12 | 3.97 | 2.23 |

Figure 5:
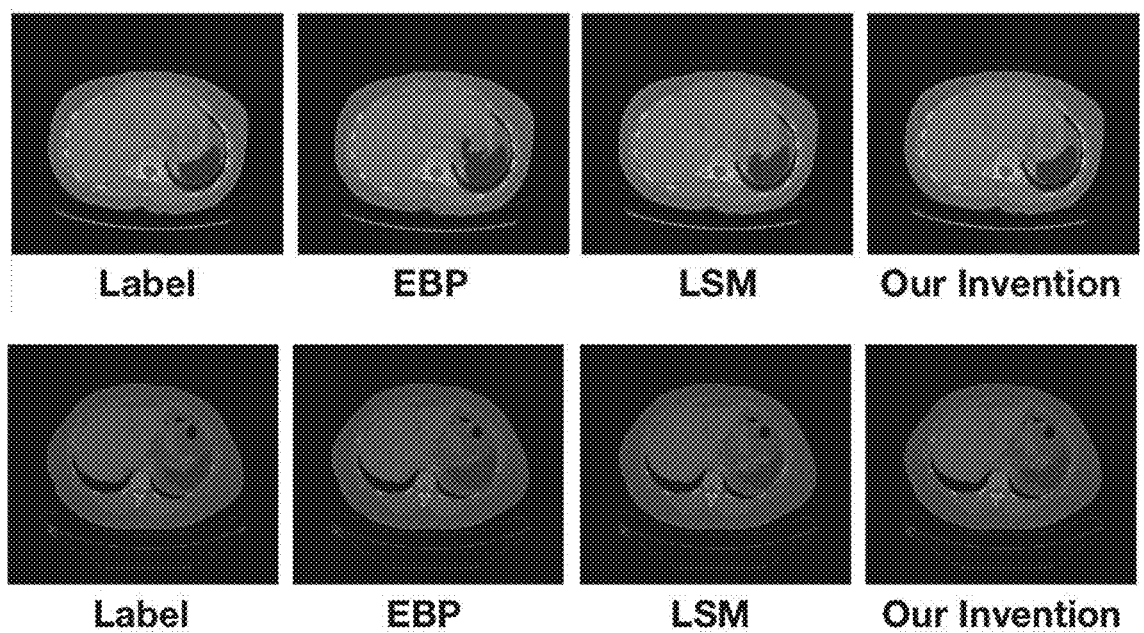
FIG. 5 is the comparison of two typical results between the present invention and other methods on the MSD spleen dataset.

The two-dimensional methods RSTN was proposed by [Qihang Yu, Lingxi Xie, Yan Wang, Yuyin Zhou, Elliot K. Fishman, and Alan L. Yuille. Recurrent saliency transformation network: Incorporating multi-stage visual cues for small organ segmentation. In Proceedings of the IEEE Conference on Computer Vision and Pattern Recognition (CVPR), pages 8280-8289, June 2018.]. The three-dimensional methods V-net was proposed by [Fausto Milletari, Nassir Navab, and Seyed-Ahmad Ahmadi. V-net: Fully convolutional neural networks for volumetric medical image segmentation. In 2016 *Fourth International Conference on 3D Hsion (3DV)*, October 2016.] The two-dimensional boundary-based method EBP [Tianwei Ni, Lingxi Xie, Huangjie Zheng, Elliot K Fishman, and Alan L Yuille. Elastic boundary projection for 3d medical image segmentation. *In Proceedings of the IEEE Conference on Computer Vision and Pattern Recognition (CVPR)*, pages 2109-2118, 2019.] and the other one LSM proposed by [Lihong Guo, Yueyun Liu, Yu Wang, Yuping Duan, and Xue-Cheng Tai. Learned snakes for 3D image segmentation. Signal Processing, 183:108013, June 2021.] are used for comparison. The presented model achieved the best segmentation accuracy with an overall 2% higher DSC than the others. By comparing the HD obtained by the three boundary-based methods, the presented model gave the smallest HD no matter before or after the voxelization, which means the presented model evolved surface closer to the target surface. FIG. 5 compares the label, EBP method, LSM method on two typical examples of the MSD spleen dataset. It can be seen from comparison that the segmentation of the presented invention is more accurately at the boundary, while the other two boundary based methods tend to over segment the spleen region.

Another public spleen dataset was also used, which contains 90 CT volumes with 43 from The Cancer Imaging Archive (TCIA) and 47 from the Beyond The Cranial Vault (BTCV) segmentation challenge. We randomly chose 45 volumes with 21 volumes from TCIA and 24 volumes from BTCV to train our DAS model, while the remaining 45 volumes were used for evaluation.

TABLE 2

The testing results on the public spleen dataset

| Methods | DSC (%) | 95% HD (mm) | Time (s) |
|---|---|---|---|
| 2D surface evolution methods LSM | 91.80% | 7.84 | 213 |
| The present invention | 93.87% | 4.69 | 76 |

Figure 6:
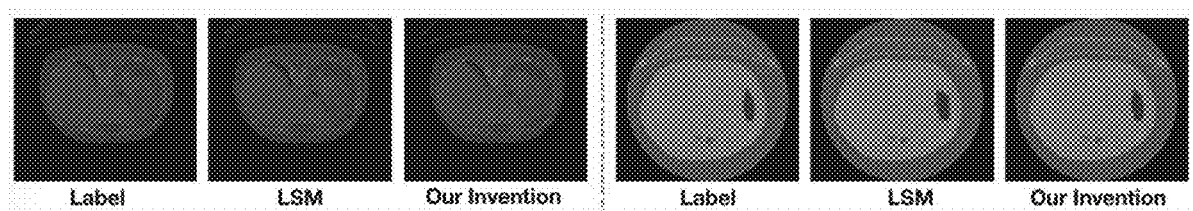
FIG. 6 is the comparison of two typical results between the present invention and other methods on the public spleen dataset.

As we can see from the Table 2, the presented model not only gives more than 2% higher DSC than LSM, but also saves more than half the computational time. Two segmentation results are displayed in FIG. 6 for a visual comparison. It is clearly shown that our model can improve the segmentation accuracy, while LSM tends to over segment the spleen region.

Whilst the foregoing description describes exemplary embodiments, it will be understood by those skilled in the art hat many variations of the embodiment can be made within the scope and spirit of the present invention.

What is claimed is:

1. A learning-based active surface model for medical image segmentation, using a method comprising:
step 1: data generation: obtaining medical images and associated ground truths, and splitting sample images into a training set and a testing set;
step 2: raw segmentation: constructing a surface initialization network, parameters of the network trained by images and labels in the training set;
step 3: surface initialization: segmenting the images in the training set by surface initialization network, and generating point cloud data as an initial surface from the segmentation;
step 4: constructing a surface evolution network, the parameters of the network trained by the initial surface obtained in step 3;
step 5: surface evolution: deforming initial surface points along offsets to obtain a predicted surface, the offsets presenting a prediction of the surface evolution network; and
step 6: surface reconstruction: reconstructing 3D volumes from set of predicted surface points set to obtain final segmentation results,
wherein a headstream part of the surface initialization network contains a convolutional layer, a batch normalization, an activation function and a max pool layer, then there are four residual modules: in a first two residual modules, the last convolutional layers have down-sampling operations, and the convolutional layers in third and the fourth residual modules are dilated convolutions: it follows an atrous spatial pyramid pooling module consisting of a 1×1 convolutional layer, three dilated convolution layers, and a global pooling layer in parallel; another two 1×1 convolutions are used to integrate features and predict a small resolution segmentation; and finally, an up-sampling operation is used to restore the small resolution segmentation to an original image size.

2. The learning-based active surface model for medical image segmentation according to claim 1, wherein each pixel-wise label, obtained in step 1, is a binary image with a same size as the corresponding sample image, with value 1 indicating a desired target organ, and value 0 otherwise, an interpolation method used in up-sampling operation is bilinear interpolation.

3. The learning-based active surface model for medical image segmentation according to claim 1, wherein the training method of the surface initialization network in step 2 further comprises:
first, cut each sample image in the training set into two-dimensional slices along the third dimension; assuming the size of a three-dimensional CT image is H×W×D, the image can be regarded as two-dimensional images of size H×W stacked together, and each two-dimensional image is called a slice of a three-dimensional CT image;
input the slices to the surface initialization network to obtain segmented predictions, where binary cross-entropy is used as a loss function for training;
the parameters of the initialization network are updated by a stochastic gradient descent method; and
pixel-wise coarse segmentation predictions are obtained as follows:
cut each sample image in the training set and testing set into two-dimensional slices along the third dimension; then sequentially input the slices of each three-dimensional CT image to the surface initialization network to obtain the two-dimensional segmentation predictions; and finally stack the two-dimensional segmentations sequentially to obtain the corresponding three-dimensional coarse segmentation prediction.

4. The learning-based active surface model for medical image segmentation according to claim 1, wherein a method to pick up the surface points from the coarse segmentation is selecting the pixels of value 1, and at least one of their adjacent pixels is of value 0;
let the set of selected surface points be $S=\{x_1, x_2, x_3, \ldots x_n\}$, where n is the number of surface points; a narrow band of the surface $\tilde{S}=\{\tilde{x}_i \in \mathcal{P} \mid d(\tilde{x}_i, S) \leq 1\}=\{\tilde{x}_1, \tilde{x}_2, \tilde{x}_3, \ldots, \tilde{x}_i, \ldots \tilde{x}_N\}$ is used as the initial surface, where $\mathcal{P}$ represents all pixels of the image, and $$d(\tilde{x}_i, S) = \min_{x \in S} dist(\tilde{x}_i, x)$$

presents a distance from the pixel $\tilde{x}_i$ to the surface S defined as the minimum distance between the pixel $\tilde{x}_i$ and the points in the surface points set S; the distance $dist(\tilde{x}_i, x)=\|\tilde{x}_i-x\|^2$ is a Euclidean distance between the two points $\tilde{x}_i$ and x, and N denotes the number of points in the set $\tilde{s}$; and the set $\tilde{s}$ is used as the initial surface for evolution.

5. The learning-based active surface model for medical image segmentation according to claim 1, wherein the headstream part of the surface evolution network consists of a KP convolutional layer, a one-dimensional normalization and a leaky activation function; then there are five parts in the encoder of the network; the first and the last part contains two KP residual modules each, while the other three parts contain 3 KP residual modules each; the last KP residual modules in the first four parts have down-sampling operation; there are four up-sampling modules in a decoder of the network, each up-sampling module contains an up-sampling layer and a shared multilayer perceptron, followed by a normalization layer and an activation function; and finally, two multilayer perceptrons are used to output the final prediction.

6. The learning-based active surface model for medical image segmentation according to claim 5, wherein some points are dropped in the down-sampling operations, and the up-sampling layers are used to restore those points by a nearest interpolation algorithm; after each up-sampling operation, the features are concatenated with corresponding low-level features in the encoder, then the shared multilayer perceptron is used to aggregate the features;

the inputs of the KP convolution are the point cloud data consisting of all points in a sphere centered on $\tilde{x}$, which is defined as $N(\tilde{x})=\{z_i \in \mathcal{P} \mid dist(z_i, \tilde{x}) \leq r\}$, $\tilde{x} \in \tilde{S}$, with r representing the radius of the sphere, $\tilde{x}$ presenting the point in the set of initial surface points, $\mathcal{P}$ representing all the pixels of the image, $z_i$ being the points in the sphere, and $\tilde{s}$ being the set of initial surface points; the KP convolution is an operation used to integrate the features; let $\mathcal{F}$ denote the input features and $f_i$ be the feature of the point $z_i$; and we define the kernel point convolution as $$(\mathcal{F} * g)(\tilde{x}) = \sum_{z_i \in N(\tilde{x})} g(z_i - \tilde{x}) f_i,$$

and the kernel function g as $$g(z_i - \tilde{x}) \sum_{k<K} \max\left(0, 1 - \frac{\|(z_i - \tilde{x}) - y_k\|}{\sigma}\right) W_k,$$

where $\{y_k \mid \|y_k\|^2 \leq r, k<K\}$ denotes the K kernel points, a denotes the influence distance of the kernel points and $\{W_k \mid k<K\}$ is the associated weight matrixes to learn from the point cloud data.

7. The learning-based active surface model for medical image segmentation according to claim 6, wherein the following L2 norm between the prediction and target offsets is used as the loss function for the surface evolution network $$\mathcal{L}_{top\_k}(\theta) = \frac{1}{M} \sum_{z_i \in N(\tilde{x})} \left(\|\delta(z_i) - \gamma(z_i)\|^2\right),$$

where the loss function $\mathcal{L}_{top\_k}(\theta)$ only supervises on the top k loss of convolutional points to focus on hard points, $z_i$ represents all the convolutional points, $\delta(z_i)$ are the ground-truth offsets of $z_i$, and $\gamma(z_i)$ are the corresponding predicted offsets; and the stochastic gradient descent method is used to update the parameters θ of the network.

8. The learning-based active surface model for medical image segmentation according to claim 7, wherein estimate the position of the predicted surface points by evolving the initial surface points along the corresponding predicted offsets:

$$u_i = \tilde{x}_i + \gamma(\tilde{x}_i), \forall \tilde{x}_i \in \tilde{S},$$

where $\tilde{x}_i$ presents the initial surface points, $\gamma(\tilde{x}_i)$ presents the corresponding predicted offsets of $\tilde{x}_i$, and $\tilde{S}$ is the set of initial surface points.

9. The learning-based active surface model for medical image segmentation according to claim 7, wherein first use a Delaunay triangulation to build up a triangle mesh from the prediction surface points set $\mathcal{U} = \{u_1, u_2, \ldots, u_N\}$, and an alpha shape mesh is obtained by removing tetrahedrons with a circumradius larger than 5; then a subdivide algorithm is used to voxelize the alpha shape mesh to obtain a closed surface; and finally adapt a flood fill algorithm to fill the holes in the closed surface and generate the final 3D segmentation.

10. The learning-based active surface model for medical image segmentation according to claim 2, wherein assuming that the size of a three-dimensional CT image is H×W×D, it is regarded as D two-dimensional images of size H×W stacked together; input the slices to the surface initialization network to obtain the predicted segmentations; calculate the difference between the predicted segmentations and the labels of the corresponding slices, where the binary cross-entropy is adapted as the loss function; the parameters of the surface initialization network are updated by the stochastic gradient descent method;

the coarse segmentation predictions are obtained as follows: firstly, all the three-dimensional CT images in the training set and the testing set are cut into two-dimensional slices along the third dimension; then sequentially input the slices of each three-dimensional CT image to the surface initialization network to obtain the two-dimensional segmentation predictions; and finally stack the two-dimensional segmentations sequentially to obtain the corresponding three-dimensional coarse segmentation prediction, that is, stacking D two-dimensional segmentations of size H×W into a three-dimensional image of size H×W×D, thus, the coarse segmentation is obtained.

11. The active surface model for medical image segmentation based on deep learning according to claim 4, wherein the headstream part of the surface evolution network consists of a KP convolutional layer, a one-dimensional normalization and a leaky activation function; then five parts are included in the encoder of the network; the first and the last part contain two KP residual modules each, while the others contain 3 KP residual modules each; the last KP residual module in the first four parts has the down-sampling operation; there are four up-sampling modules in the decoder of the network, each of which contains an up-sampling layer and a shared multilayer perceptron, followed by a normalization layer and an activation function; and finally, two multilayer perceptrons are used to output the final prediction.

* * * * *